US 8,771,849 B2

(12) United States Patent
Nemoto et al.

(10) Patent No.: US 8,771,849 B2
(45) Date of Patent: Jul. 8, 2014

(54) PERPENDICULAR MAGNETIC RECORDING MEDIUM AND MAGNETIC RECORDING/REPRODUCING APPARATUS USING THE SAME

(75) Inventors: Hiroaki Nemoto, Kanagawa (JP); Ikuko Takekuma, Kanagawa (JP); Ichiro Tamai, Kanagawa (JP); Yoshiyuki Hirayama, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 739 days.

(21) Appl. No.: 12/288,654

(22) Filed: Oct. 21, 2008

(65) Prior Publication Data
US 2009/0195924 A1 Aug. 6, 2009

(30) Foreign Application Priority Data

Nov. 2, 2007 (JP) ................................. 2007-286391

(51) Int. Cl.
*G11B 5/66* (2006.01)
(52) U.S. Cl.
USPC .......................................................... 428/831
(58) Field of Classification Search
USPC ............................... 428/831–832.3, 827–829
See application file for complete search history.

(56) References Cited

U.S. PATENT DOCUMENTS

| | | | |
|---|---|---|---|
| 6,670,056 B2 | 12/2003 | Hikosaka | |
| 6,699,600 B2 * | 3/2004 | Shimizu et al. | 428/828 |
| 6,767,651 B2 | 7/2004 | Uwazumi et al. | |
| 6,777,066 B1 * | 8/2004 | Chang et al. | 428/828 |
| 6,884,520 B2 | 4/2005 | Oikawa et al. | |
| 2002/0114975 A1 | 8/2002 | Oikawa et al. | |
| 2002/0164501 A1 | 11/2002 | Hikosaka | |
| 2003/0152809 A1 | 8/2003 | Oikawa et al. | |
| 2003/0180576 A1 | 9/2003 | Nakamura et al. | |

(Continued)

FOREIGN PATENT DOCUMENTS

| | | |
|---|---|---|
| JP | 2002-197630 | 7/2002 |
| JP | 2002-334424 | 11/2002 |

(Continued)

OTHER PUBLICATIONS

Oikawa et al, "High Performance CoPtCrO Single Layered Perpendicular Media With No Recording Demagnetization" IEEE Transactions on Magnetic, vol. 36, No. 5, p. 2393, 2000.

(Continued)

*Primary Examiner* — Mark Ruthkosky
*Assistant Examiner* — Linda Chau
(74) *Attorney, Agent, or Firm* — Zilka-Kotab, PC

(57) ABSTRACT

Embodiments of the present invention help allow accurate control of the magnetization reversal in a magnetic recording layer in small reversal units, whereby high-density recording can be achieved. According to one embodiment, by forming an intermediate layer having a granular structure similar to that of the magnetic recording layer below the magnetic recording layer, a continuous crystal grain boundary is formed at the interface between the magnetic recording layer and the intermediate layer, thereby preventing incomplete formation of the crystal grain boundary found in the initial growth layer of the magnetic recording layer. The intermediate layer comprises a non-magnetic alloy comprising Co and Cr as its main components and an oxide such as Al, Cr, Hf, Mg, Nb, Si, Ta, Ti and Zr. Further, the average content of the oxygen element in the intermediate layer is in the range from 6 at % to 20 at %.

20 Claims, 9 Drawing Sheets

(56) References Cited

U.S. PATENT DOCUMENTS

| | | | |
|---|---|---|---|
| 2005/0013093 A1 | 1/2005 | Nagasawa et al. | |
| 2006/0088733 A1* | 4/2006 | Hosoe et al. | 428/827 |
| 2006/0139799 A1* | 6/2006 | Wu et al. | 360/97.03 |
| 2006/0166039 A1* | 7/2006 | Berger et al. | 428/828.1 |
| 2006/0204791 A1* | 9/2006 | Sakawaki et al. | 428/828.1 |
| 2006/0222902 A1* | 10/2006 | Mukai | 428/827 |
| 2006/0275629 A1* | 12/2006 | Ikeda et al. | 428/831.2 |
| 2007/0243418 A1* | 10/2007 | Fullerton et al. | 428/828 |

FOREIGN PATENT DOCUMENTS

| | | |
|---|---|---|
| JP | 2003-123239 | 4/2003 |
| JP | 2003-178412 | 6/2003 |
| JP | 2003-203330 | 7/2003 |
| JP | 2004-164692 | 6/2004 |
| JP | 2005-039040 | 2/2005 |
| JP | 2005-093040 | 4/2005 |

OTHER PUBLICATIONS

Oikawa et al, "Microstructure and Magnetic Properties of CoPtCr-$SiO_2$ Perpendicular Recording Media" IEEE Transactions on Magnetics, vol. 38, No. 5, p. 1976, 2002.

Mukai et al, "Signal to Media Noise Ratio Improvement of CoCrPt-$SiO_2$ Granular Perpendicular Media by Staked Ru Underlayer" Journal of Applied Physics, vol. 97, p. 10N119, 2005.

* cited by examiner (a)

| | Target material for intermediate layers | | Process gas | | |
|---|---|---|---|---|---|
| | Alloy composition | Oxide material /content | Oxygen Partial Pressure (Pa) | Coercivity Hc (kA/m) | SNR (dB) |
| Sample 2-1 | CoCr$_{40}$ | none | 0.1 | 420 | 17.3 |
| Sample 2-2 | CoCr$_{40}$ | SiO$_2$/7 mol% | 0.03 | 413 | 17.8 |
| Sample 2-3 | CoCr$_{40}$ | SiO$_2$/9 mol% | 0.02 | 427 | 17.5 |
| Sample 2-4 | CoCr$_{40}$ | TiO$_2$/7 mol% | 0.03 | 435 | 18.2 |
| Sample 2-5 | CoCr$_{40}$ | Ta$_2$O$_5$/2.5 mol% | 0 | 401 | 18.0 |
| Sample 2-6 | CoCr$_{40}$ | Ta$_2$O$_5$/1.5 mol% SiO$_2$/3 mol% | 0 | 409 | 18.5 |
| Sample 2-7 | CoCr$_{40}$ | ZrO$_2$/7 mol% | 0.03 | 385 | 16.6 |
| Sample 2-8 | CoCr$_{40}$ | Al$_2$O$_3$/4.5 mol% | 0.03 | 392 | 16.9 |
| Comparative Example 2-1 | CoCr$_{40}$ | SiO$_2$/11 mol% | 0 | 389 | 14.3 |
| Comparative Example 2-2 | CoCr$_{40}$ | TiO$_2$/6 mol% SiO$_2$/6 mol% | 0.02 | 378 | 14.7 |

FIG. 11

| | Target material for Intermediate layer | | Process gas | | |
|---|---|---|---|---|---|
| | Alloy Composition | Oxide material /content | Oxygen partial Pressure (Pa) | Coercivity Hc (kA/m) | SNR (dB) |
| Sample 3-1 | $CoCr_{40}Ni_3$ | $SiO_2$/7 mol% | 0.03 | 437 | 18.4 |
| Sample 3-2 | $CoCr_{40}Ni_6$ | $SiO_2$/7 mol% | 0.03 | 443 | 18.1 |
| Sample 3-3 | $CoCr_{40}Pd_4$ | $SiO_2$/7 mol% | 0.03 | 434 | 19.2 |
| Sample 3-4 | $CoCr_{40}Pd_8$ | $SiO_2$/7 mol% | 0.03 | 435 | 18.8 |
| Sample 3-5 | $CoCr_{40}Cu_3$ | $SiO_2$/7 mol% | 0.03 | 446 | 18.2 |
| Sample 3-6 | $CoCr_{40}Pt_4$ | $SiO_2$/7 mol% | 0.03 | 451 | 19.3 |
| Sample 3-7 | $CoCr_{40}Pd_4$ | none | 0.1 | 440 | 19.4 |
| Sample 3-8 | $CoCr_{40}Ni_9$ | $SiO_2$/7 mol% | 0.02 | 405 | 17.1 |
| Sample 3-9 | $CoCr_{40}Pd_{12}$ | $SiO_2$/7 mol% | 0.02 | 416 | 16.6 |

PERPENDICULAR MAGNETIC RECORDING MEDIUM AND MAGNETIC RECORDING/REPRODUCING APPARATUS USING THE SAME

CROSS-REFERENCE TO RELATED APPLICATION

The instant nonprovisional patent application claims priority to Japanese Patent Application No. 2007-286391 filed Nov. 2, 2007, which is incorporated by reference in its entirety herein for all purposes.

BACKGROUND OF THE INVENTION

Hard disk drives (HDD) have become indispensable information storage apparatuses for computers and various consumer electronics products, particularly, for the purpose of large capacity information storage. Magnetic recoding systems are basically classified into two types of technical methods based on the direction of a magnetization vector in the magnetic recording layer in a magnetic recording medium: one is longitudinal magnetic recording, and the other is perpendicular magnetic recording. The perpendicular magnetic recording system is considered superior in high-density recording to the conventional longitudinal magnetic recording system, since its magnetization state of recorded information is stable due to a small demagnetizing field acting on a region near the magnetization transition region between recorded bits. In recent years, the recording systems of HDDs have been under transition from the longitudinal magnetic recording system to the perpendicular magnetic recording system. While the recording density attained by the longitudinal magnetic recording system is about 100 Gb/inch$^2$, it has been demonstrated that a recording density higher than 300 Gb/inch$^2$ can be attained by the perpendicular magnetic recording system.

IEEE Transactions on Magnetic, vol. 36, pg. 2393, (2000) ("Non-Patent Document 1") and IEEE Transactions on Magnetics, vol. 38, pg. 1976, (2002) ("Non-Patent Document 2") disclose the typical structures of the current perpendicular magnetic recording media. The perpendicular magnetic recording medium has two magnetic layers: a soft-magnetic underlayer and a magnetic recording layer. These magnetic layers are separated by a non-magnetic intermediate layer. The magnetic recording layer has a structure in which fine magnetic grains comprising a CoCrPt-based alloy with the crystal c-axis oriented in the direction perpendicular to the film surface are separated by a crystal grain boundary comprising an oxide or the like (granular structure). For the intermediate layer, a polycrystalline material having the same hexagonal closed pack structure (hcp) as that of a CoCrPt alloy is used for improving the crystal orientation of the magnetic recording layer, and Ru is used particularly preferably.

In the magnetic recording layer having the granular structure, since exchange interactions acting between the magnetic grains separated by the crystal grain boundary is smaller than those acting on the inside of each of the magnetic grains, the magnetic grain is a basic unit for magnetization reversal in magnetic recording. However, it is difficult to completely eliminate the exchange interactions between the magnetic grains, and the magnetization reversal unit in the magnetic recording layer tends to be larger than the average grain size of the magnetic grains. It is one of the main purposes in the development of the media to decrease the exchange interaction between the magnetic grains as small as possible and to improve the independency of each of the magnetic grains in the magnetization direction, thereby enabling high-density recording of information. At the same time, it is necessary to further scale down the magnetic grains and make the grain size uniform.

The intermediate layer has the role of not only improving the crystal orientation of the magnetic recording layer but also controlling the fine granular structure of the magnetic recording layer. It has been known that the fine structure of the magnetic recording layer formed above the intermediate layer changes greatly depending on the material and the formation method for the intermediate layer. Accordingly, design of the intermediate layer is extremely important for improving the high-density recording performance of the perpendicular magnetic recording medium, and various structures, materials, and manufacturing methods have been proposed so far for the intermediate layer.

Japanese Patent Publication No. 2002-197630 ("Patent Document 1") discloses a perpendicular magnetic recording medium having a magnetic recording layer of a granular structure comprising magnetic grains of CoCrPt alloy crystals and a crystal grain boundary of an oxide and an intermediate layer comprising Ru. The intermediate Ru layer is formed in two steps, in which an Ru layer of 15 nm thickness is formed under low Ar gas pressure in the first step, and an Ru layer of 10 nm thickness is formed under high Ar gas pressure in the second step. By forming a magnetic recording layer above the intermediate layer thus formed, a high signal-to-noise ratio (SNR) can be attained. Journal of Applied Physics, vol. 97, pg. 10N119, (2005) ("Non-Patent Document 3") discloses the result of close investigations into the fine structure of a perpendicular magnetic recording medium formed by a similar method. Ru layers formed under different film forming conditions have different fine structures; the first Ru layer has a closely packed structure, and the second Ru layer has a physically separated granular structure. By properly combining the first Ru layer and the second Ru layer, formation of the crystal grain boundary in the initial region of the magnetic recording layer can be promoted while attaining good crystal orientation of the magnetic recording layer. In this case, it appears that the first Ru layer mainly has the role of improving the crystal orientation, while the second Ru layer mainly has the role of promoting the grain boundary formation.

Japanese Patent Publication No. 2003-123239 ("Patent Document 2") and Japanese Patent Publication No. 2003-178412 ("Patent Document 3") disclose perpendicular magnetic recording media each having a magnetic recording layer with a granular structure and an intermediate layer comprising an alloy material formed by adding an additive to Ru. The intermediate layer is formed by using an Ru-based alloy formed by adding one or more materials selected from the group consisting of C, Cu, W, Mo, Cr, Ir, Pt, Re, Rh, Ta, and V to Ru. It is preferred that a seed layer having a face-centered cubic (fcc) crystal structure with its (111) axis oriented in the direction perpendicular to the film surface be also present below the intermediate layer. Examples of the seed layer include a metal or an alloy containing either one of Cu, Au, Pd, Pt, and Ir, or an alloy containing at least Ni and Fe (Ni—Fe—Cr, etc.). According to Patent Documents 2 and 3, since this structure attains improvement in the crystal orientation and the initial growth layer of the magnetic recording layer and at the same time attains decrease in the crystal grain size of the magnetic recording layer, improvement in the performance of the recording medium is attained. In this case, it appears that the seed layer mainly has the role of improving the crystal orientation and the Ru alloy material mainly has the role of promoting the grain boundary formation.

Japanese Patent Publication NO. 2002-334424 ("Patent Document 4") and Japanese Patent Publication No. 2005-39040 ("Patent Document 5") disclose intermediate layers in which oxides are added to Ru or an Ru alloy. To the oxides, an Si oxide, Al oxide, Zr oxide, Ti oxide, Hf oxide, etc. can be applied. Further, according to Patent Document 4, it is also possible to replace the Ru alloy with an Re alloy. Since such intermediate layers each have a structure in which the crystal grain boundary comprising the oxide surrounds the fine crystal grains comprising the Ru alloy, those intermediate layers interact well with the granular structure of the magnetic recording layer. Accordingly, it is possible to promote the formation of the oxide crystal grain boundary in the initial growth layer of the magnetic recording layer to attain the improvement in medium performance. According to Patent Documents 4 and 5, a seed layer for controlling the crystal orientation of the intermediate layer and the magnetic recording layer is preferably applied also to the intermediate layer. According to Patent Document 4, the seed layer can be formed of an alloy such as NiAl, FeAl, CoFe, CoZr, NiTi, AlCo, AlRu, and CoTi. Patent Document 5 gives examples of alloys such as RuCo, RuCr, and RuCoCr as the material applied to a layer corresponding to the seed layer.

In selecting the material of the intermediate layer, matching with the crystal lattice constant of the magnetic recording layer is also important. Japanese Patent Publication No. 2003-203330 ("Patent Document 6") discloses that the crystal orientation of the magnetic recording layer are improved and segregation of the oxide to the grain boundary is promoted by improving the lattice matching between the intermediate layer and the magnetic recording layer. In this case, the intermediate layer can be constituted of a non-magnetic metal comprising at least one element of Ru, Os, or Re as a main ingredient. Patent Document 6 discloses that improvement in medium SNRs was observed by limiting mismatching of the a-axis lattice constant to no more than 6% and mismatching of the c-axis lattice constant to no more than 4% between the crystal lattices of the magnetic recording layer and the intermediate layer both having the hexagonal close packed (hcp) structure.

BRIEF SUMMARY OF THE INVENTION

Embodiments of the present invention provide accurate control of the magnetization reversal in a magnetic recording layer in small reversal units, whereby high-density recording can be achieved. According to the embodiment of FIG. 1, by forming an intermediate layer 14 having a granular structure similar to that of the magnetic recording layer 15 below the magnetic recording layer, a continuous crystal grain boundary is formed at the interface between the magnetic recording layer 15 and the intermediate layer 14, thereby preventing incomplete formation of the crystal grain boundary found in the initial growth layer of the magnetic recording layer 15. The intermediate layer 14 comprises a non-magnetic alloy comprising Co and Cr as its main components and an oxide such as Al, Cr, Hf, Mg, Nb, Si, Ta, Ti and Zr. Further, the average content of the oxygen element in the intermediate layer 14 is in the range from 6 at % to 20 at %.

BRIEF DESCRIPTION OF THE DRAWINGS

FIG. 10 is a table showing the target composition for the formation of an intermediate layer, film forming conditions, and magnetic characteristics in a perpendicular magnetic recording medium of Example 2.

FIG. 11 is a table showing the target composition for the formation of an intermediate layer, film forming conditions, and magnetic characteristics in a perpendicular magnetic recording medium of Example 3.

DETAILED DESCRIPTION OF THE INVENTION

Figure 1:
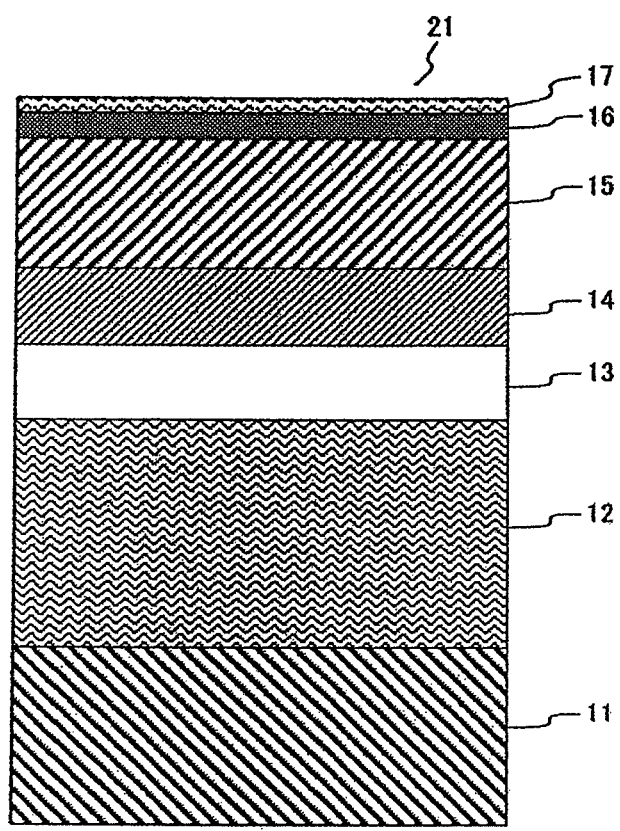
FIG. 1 is a view showing the typical cross sectional structure of a perpendicular magnetic recording medium according to an embodiment of the invention.

Embodiments of the present invention relate to a magnetic recording medium suited for perpendicular magnetic recording and a magnetic recording/reproducing apparatus using the same.

In view of the prior art for the intermediate layer mentioned above, extensive study and research has been conducted to attain improvement in the performance of a perpendicular magnetic recording medium by improving intermediate layer material. Among the prior arts described above, a method of adding a non-metal material such as an oxide or nitride to the intermediate layer thereby attaining a structure similar to the granular structure of the magnetic recording layer was considered most promising as a solution to the structural deficiency found in the initial growth layer of the magnetic recording layer. In the process for forming the magnetic recording layer, it is expected that the magnetic metal material grows on the metal material and the non-metal material grows on the non-metal material, thus, it will be possible to completely remove the initial growth layer of the magnetic recording layer if successful.

In view of the above, the intermediate layer in which oxides are added to Ru or an Ru alloy, has been investigated. When the amount of the oxide added was relatively small, the coercivity Hc of the magnetic recording layer increased, and improvements in the grain boundary formation in the initial growth layer were occasionally observed. However, when the additive amount of the oxide was brought closer to the amount of the oxide in the magnetic recording layer to form a crystal grain boundary with larger width (thickness), it was found that the grain size of fine Ru metal crystal grains formed in the intermediate layer decreased greatly, and correspondingly, the crystal orientation of the intermediate layer was degraded. While the problem could be mitigated slightly by disposing an appropriate seed layer below the intermediate layer or by using an alloy comprising Ru as its main component instead of pure Ru, these methods are not considered sufficient however.

Embodiments of the present invention has been accomplished in view of the foregoing situations, and it is intended to improve the fine structure of the initial growth layer while maintaining the crystal orientation in the magnetic recording layer and to provide a perpendicular magnetic recording medium suitable for high-density recording and a magnetic recording/reproducing apparatus.

A representative perpendicular magnetic recording medium of an embodiment of the invention is one having at least an intermediate layer, a magnetic recording layer, and a protecting layer formed above a non-magnetic substrate, in which the intermediate layer is constituted of a mixture of a first material and a second material, the first material is a non-magnetic alloy comprising Co and Cr as its main components, the second material is an oxide, and the average content ratio of an oxygen element in the intermediate layer is in the range from 6 at % to 20 at %.

Said oxide includes, for example, Al, Cr, Hf, Mg, Nb, Si, Ta, Ti, or Zr.

Ru is a metal having a higher melting point than those of other materials each having an hcp structure, and generally, its crystal grain size can be scaled down easily. It can be inferred that this fundamental property of Ru causes the crystal grain size to decrease excessively when it is mixed with a non-metal material such as an oxide or nitride. Accordingly, when a polycrystalline metal material of the hcp structure whose crystal grain size can easily increase relative to Ru is applied instead of Ru, it can be expected that an intermediate layer with an appropriate crystal grain size is formed when mixed with an oxide.

Co is one of the metals having the hcp structure, and the hcp structure tends to be stabilized by adding a Cr element to form a CoCr alloy. Further, a thin CoCr alloy film formed by a sputtering method can maintain a good hcp structure when the content of Co is about more than 45 at %. Since the CoCr-based alloy has a lower melting point than that of Ru and its crystal grain size in a thin-film state tends to become large, it is an alloy material capable of forming a high performance intermediate layer when combined with an oxide or a nitride.

However, pure Co is a ferromagnetic material. When an intermediate layer having ferromagnetism is disposed right below a magnetic recording layer, the intermediate layer and the magnetic recording layer are coupled ferromagnetically, and the magnetization in the intermediate layer is likely to affect the magnetic recording characteristics of the magnetic recording layer. Accordingly, the use of the Co alloy as the intermediate layer necessitates properly controlling the material and the content of impurities to eliminate the ferromagnetism of the Co alloy layer. In the case of the CoCr alloy, magnetization in the intermediate layer can be decreased to a negligible level by limiting the content of the Co element to less than 65 at %.

If the crystal grain size of the intermediate layer is excessively small even with the use of the CoCr alloy, it is effective to further add a metal material showing the fcc crystal structure in a pure state to the CoCr alloy. Such materials include Pt, Pd, Ni, and Cu. These metal materials have the effect of promoting the crystal growth of the CoCr alloy and do not disturb the hcp crystal structure of the CoCr alloy so long as the additive amount is small. Among the materials described above, Pt and Pd are elements having a relatively large crystal lattice space, and when added to the CoCr alloy, they can extend the crystal lattice size of the alloy. Since the crystal lattice size of the CoCr alloy is smaller than that of the CoCrPt magnetic alloy used for the magnetic recording layer, addition of Pt or Pd also has the effect of improving the crystal lattice matching between the intermediate layer and the magnetic recording layer.

As described above, in the perpendicular magnetic recording medium of embodiments of the invention, the intermediate layer comprises a mixed material of a metal material and an oxide to form a granular structure similarly to the magnetic recording layer. A CoCr-based alloy is used for the metal material of the intermediate layer and the alloy composition is controlled so as to form a non-magnetic metal with the hcp structure. This allows for formation of a clear crystal grain boundary in the initial growth layer of the magnetic recording layer without deteriorating its crystal orientation. As a result, exchange interaction between the magnetic crystal grains and the reversal unit of magnetization is decreased, and the magnetization reversal in the magnetic recording layer can be controlled accurately in small reversal units, whereby a perpendicular magnetic recording medium suitable for high-density magnetic recording can be obtained.

Further, the magnetic recording/reproducing apparatus according to an embodiment of the invention has a perpendicular magnetic recording medium, a medium driving section for driving the magnetic recording medium, a magnetic head for performing recording/reproducing operations on the magnetic recording medium, and a head driving section for positioning the magnetic head at a desired track position on the magnetic recording medium, in which the perpendicular magnetic recording medium has a non-magnetic substrate and a soft-magnetic underlayer, an intermediate layer, a magnetic recording layer, and a protecting layer formed above the substrate, and the intermediate layer is formed of the material and to the configuration described above.

According to the perpendicular magnetic recording medium of an embodiment of the invention, a continuous crystal grain boundary structure is formed at the boundary face between the magnetic recording layer and the intermediate layer, thereby enabling the elimination of incomplete structures of crystal grain boundaries present in the initial growth layer of the conventional magnetic recording layer. The structural improvement can decrease the exchange coupling between the magnetic grains, whereby the magnetization reversal in the magnetic recording layer can be controlled accurately in small reversal units, and a perpendicular magnetic recording medium suitable for high-density magnetic recording and having a higher read signal quality can be provided.

Further, according to the magnetic recording/reproducing apparatus of an embodiment of the invention, since the magnetic reversal in the perpendicular magnetic recording medium can be accurately controlled in small reversal units, high-density magnetic recording having higher reproduced signal quality can be attained. Further, since the intermediate layer of the perpendicular magnetic recording medium can be formed thin, the distance from the magnetic head to the soft-magnetic underlayer can be shortened, whereby more stable recording characteristics can be achieved by increasing the magnetic field generated by the magnetic head.

The basic configuration of a perpendicular magnetic recording medium and the schematic configuration of a magnetic recording/reproducing apparatus according to an embodiment of the invention are described below with reference to FIG. 1 to FIG. 3.

FIG. 1 schematically shows a cross sectional view of the basic structure of a perpendicular magnetic recording medium according to an embodiment of the invention. The perpendicular magnetic recording medium shown in FIG. 1 has a structure in which a non-magnetic substrate 11, a soft-magnetic underlayer 12, a seed layer 13, an intermediate layer 14, a magnetic recording layer 15, a protecting layer 16, and a lubricant layer 17 are formed in this order.

Various substrates with smooth surfaces can be used for the non-magnetic substrate 11. For example, an NIP-plated aluminum alloy substrate or a reinforced glass substrate, which has heretofore been used for magnetic recording media, can be used. In addition, a plastic substrate comprising resin such as polycarbonate used for optical disk media can also be used. However, the plastic substrate entails some restrictions, such as its insufficient hardness and its tendency to deformation at high temperature.

For the soft-magnetic underlayer 12, microcrystalline alloys of FeTaC and FeSiAl (sendust) and alloys of CoNbZr, CoTaZr, and CoFeTaZr, which are amorphous Co-based alloys, can be used. The soft-magnetic underlayer 12 is disposed so as to attract the magnetic flux from a recording head to be used and increase the density of the magnetic flux permeating the perpendicular magnetic layer 15. Thus, the soft magnetic alloy is designed such that its saturation magnetic flux density and its film thickness serve that purpose. The optimal film thickness, while varying depending on the structure and the characteristics of the magnetic head, is generally in the range from 20 nm to 200 nm in view of productivity. When the density of the magnetic flux from the recording head can be maintained at a necessary level, the soft-magnetic underlayer 12 may be eliminated.

The soft-magnetic underlayer 12 may also be formed of a plurality of layers. Known structures include one in which an Ru layer is put between two soft magnetic layers to antiferromagnetically couple them and circulate the magnetic flux in the soft-magnetic underlayer 1 and one in which an antiferromagnetic material such as an MnIr alloy is provided below the soft magnetic layer so that the magnetization direction of the soft magnetic layer is fixed except during recording. Such structures are said to have mainly the effect of decreasing reproduction noises attributable to the magnetic flux generated from the soft-magnetic underlayer 12.

The seed layer 13 is disposed optionally between the soft-magnetic underlayer 12 and the intermediate layer 14. As the material for the seed layer 13, polycrystalline materials having a face centered cubic (fcc) structure or a hexagonal close packed (hcp) structure or amorphous materials are selected. For example, it contains one or more elements selected from Ta, Ni, Cr, Cu, Ti, Fe, W, Co, Ru, Pt, Pd, and C. Since the seed layer 13 improves the crystal orientation of the intermediate layer 14 or prevents mixing of the soft-magnetic underlayer 12 and the intermediate layer 14, it is often effective for the improvement of the recording/reproducing performance of the medium.

When an amorphous material such as a Ta alloy layer is used for the seed layer 13, the intermediate layer 14 having the hexagonal close packed (hcp) crystal structure has the property of growing crystals such that their close packed faces are in parallel with the film forming surface under appropriate conditions. Accordingly, the c-axis of the intermediate layer tends to be oriented in the direction perpendicular to the film surface.

When a material having the polycrystalline structure such as an Ru alloy layer or Ni alloy layer is used for the seed layer 13, the intermediate layer 14 having the hexagonal close packed (hcp) crystal structure can grow epitaxially above the seed layer. Accordingly, the c-axis of the intermediate layer tends to be oriented in the direction perpendicular to the film surface.

Among the polycrystalline seed layer materials, most of Ni alloys having the fcc structure have a preferred effect on the formation of the fine structures in the intermediate layer 14 and the magnetic recording layer 15. Particularly, when an Ni alloy seed layer containing Ta or W at 10 at % or less is used, the coercivity of the magnetic recording layer 15 sometimes increases remarkably.

Further, the seed layer 13 can also be formed of a plurality of layers. For example, a seed layer having a more excellent crystal orientation and a finer structure than the seed layer comprising a single NiW alloy layer can be obtained by forming a Ti layer, Cu layer, and NiW alloy layer in this order.

For the intermediate layer 14, a material formed by mixing a non-magnetic alloy comprising Co and Cr as components and a metal oxide is used. The intermediate layer formed of such a material has a so-called granular structure in which fine crystal grains comprising a CoCr-based alloy are surrounded by an oxide grain boundary. Since this structure is similar with the magnetic recording layer 15 formed on the intermediate layer 14, it has a function of promoting the formation of the fine structure in the initial growth layer of the magnetic recording layer. Each of the fine crystal grains comprising the CoCr-based alloy has the hcp crystal structure. By improving the crystal orientation of the CoCr-based alloy grains in the intermediate layer 14, the crystal orientation of the magnetic recording layer 15 can be improved.

An average content of the oxygen elements in the intermediate layer 14 may be in the range from 6 at % to 20 at %. Most of the oxygen elements are present as metal oxides in the intermediate layer 14. When the content of oxygen is less than 6 at %, formation of the oxide grain boundary becomes incomplete, and scaling-down of the CoCr-based alloy grains does not proceed sufficiently. When the oxygen content is more than 20 at %, a portion of oxygen intrudes into the inside of the CoCr-based alloy grains, making it difficult to maintain a good crystal orientation. The intermediate layer 14 can contain Al, Cr, Hf, Mg, Nb, Si, Ta, Ti, Zr, etc. as the additive material for forming the oxides, and Si, Ta, and Ti may be particularly desirable.

The content of the Co element in the metal elements in the intermediate layer 14 may be in the range from 45 at % to 65 at %. When the Co content is less than 45 at % in the thin CoCr-based alloy film formed by a sputtering method, it is difficult to maintain a good hcp crystal structure. Further, when the content of Co is more than 65 at %, magnetization generated in the intermediate layer is increased, and undesirable effects of the magnetization on the magnetic recording characteristics of the magnetic recording layer 15 are not negligible.

Further, the intermediate layer 14 may contain one or more metal materials selected from the group consisting of Pt, Pd, Ni, and Cu at a content of more than 2 at % and less than 8 at %. These metal materials have the effect of promoting the crystal growth of the CoCr alloy and serve to maintain the crystal grain size of the intermediate layer at an appropriate size when mixed with the oxide. Further, since the metal materials each have the fcc crystal structure, they do not disturb the hcp crystal structure of the CoCr alloy if the additive amount is small. However, when the content of the metal elements is less than 2 at %, those effects are not so remarkable. Since the metal elements have high wettability into the underlying seed layer 13, when in contrast the content increases to more than 8 at %, they may hinder the formation of the crystal grain boundary comprising the oxide, particularly, in the initial layer of the intermediate layer 14. Further, among the metal materials described above, Pt and Pd are more preferred for improving the crystal lattice matching between the intermediate layer and the magnetic recording layer since they have the effect of extending the crystal lattice size of the CoCr alloy.

The thickness of the intermediate layer 14 may be in the range from 2 nm to 6 nm. In a region where the thickness of the intermediate layer 14 is less than 2 nm, formation of the fine structure in the intermediate layer 14 is not sufficient, and it is difficult to improve the crystal orientation of the intermediate layer. In this case, it is difficult to provide the magnetic recording layer 15 with a good granular structure. When the thickness of the intermediate layer 14 is more than 6 nm, the grain size distribution of the magnetic grains of the magnetic recording layer 15 tends to increase; further, the distance from the magnetic head to the soft-magnetic underlayer 12 increases. Due to the effects described above, the recording/reproducing performance of the medium sometimes lowers remarkably.

The magnetic recording layer 15 can be formed by adding a non-metal material such as an oxide to a ferromagnetic alloy material having large perpendicular magnetic anisotropy. As the ferromagnetic alloy material, for instance, Co—Pt and Fe—Pt alloys and alloys formed by adding an element such as Cr, Ni, Cu, Nb, Ta, B, etc. to them, as well as an Sm—Co alloy and $[Co/Pd]_n$ multilayer film (artificial superlattice film) may be used. Among the materials described above, a Co—Cr—Pt alloy having a stable hcp crystal structure with an axis of easy magnetization in the direction of the c-axis and is particularly preferred in view of combination with the intermediate layer 14 described above. In this case, since the crystal grains in the intermediate layer 14 and the magnetic recording layer 15 each have the hcp crystal structure, the perpendicular magnetization film can be obtained easily by epitaxially growing the magnetic recording layer 15 on the intermediate layer 14 in which the crystal c-axis is oriented perpendicularly.

Further, the magnetic recording layer 15 may contain oxygen elements at a content of more than 6 at % and less than 20 at % in the same manner as in the intermediate layer 14. Most of the oxygen elements are present as metal oxides in the magnetic recording layer 15. The oxides segregate from the magnetic crystal grains to form crystal grain boundaries, which, as a result, forms a granular structure with a number of fine magnetic crystal grains. The magnetic recording layer 15 can contain, for example, Al, Cr, Hf, Mg, Si, Ta, Ti, Zr as the additive material for forming the oxides, with Si, Ta, and Ti used particularly desirably. If the content of oxygen is less than 6 at %, the magnetic grains cannot be separated sufficiently by the grain boundary to generate strong exchange coupling between the magnetic grains, so that it is difficult to decrease medium noises. Further, when the content of oxygen is more than 20 at %, a portion of oxygen intrudes into the inside of the magnetic grain, which results in the deterioration of the magnetic characteristics of the magnetic grain core. As a material for the crystal grain boundary, a nitride can also be used instead of the oxide.

The magnetic recording layer 15 can also be formed of a plurality of magnetic layers of different magnetic characteristics. In this case, the magnetic layers constituting the magnetic recording layer 15 are magnetically coupled to each other. The magnetic layer not in adjacency with the intermediate layer 14 (second recording layer) may not have the granular structure. That is, the content of the oxides as the grain boundary material may be smaller than that in the magnetic layer disposed adjacently to the intermediate layer (first recording layer), or the oxides may not be contained at all. A thin non-magnetic layer is sometimes inserted between a plurality of the magnetic layers for weakening exchange interactions between the magnetic layers.

The total thickness of the magnetic recording layer 15 may be in the range from 5 nm to 40 nm, more desirably, in the range from 10 mm to 25 nm. When the total thickness of the magnetic recording layer is less than 5 nm, thermal stability may be insufficient. When the thickness is more than 40 nm, the grain size is excessively large, which may result in increase of noises.

For obtaining good recording/reproducing performance, the full width at half maximum $\Delta\theta 50$ of a rocking curve of the intermediate layer 14 and the magnetic recording layer 15 may be about 4° or less. $\Delta\theta 50$ represents the extent of scattering of the crystal axis orientation, which can be measured by an X-ray diffraction method. Increase in the $\Delta\theta 50$ value means degradation of the crystal orienting properties, and since this extends the magnetic reversal field distribution of the perpendicular magnetic recording medium, this often results in the lowering of the recording/reproducing performance.

The intermediate layer 14 and the magnetic recording layer 15 each having the granular structure are constituted of a number of crystal grains, and the grain diameter of the crystal grains may be in the range from 5 nm to 15 nm. When the grain diameter is less than 5 nm, the thermal stability of the magnetization state in the magnetic recording layer may be insufficient. When the grain diameter is more than 15 nm, medium noises may increase excessively. The crystal grain size of the intermediate layer 14 and the magnetic recording layer 15 can be measured, for example, by a transmission electron microscope (TEM).

For the protecting layer 16, a hard thin film comprising mainly carbon is used. Further, with an aim of enhancing its lubricating properties when the head and the medium are in contact with each other, the surface of the protecting layer 16 is coated with the lubricant layer 17 comprising fluoropolymer oil such as perfluoro polyether (PFPE) oil. The coating method of the lubricant layer 17 includes, for example, a dipping method or spin coating method.

For preparing each of the layers stacked above the non-magnetic substrate 11, various thin film forming techniques used for the fabrication of semiconductors, magnetic recording media, and optical recording media can be used except for the lubricant layer 17. As the thin film forming techniques, a DC sputtering method, RF sputtering method, and vacuum vapor deposition method are well-known. In the sputtering methods, the film forming rate is relatively high, a layer of high purity is obtained irrespective of material used, and the fine structure and the thickness of the thin film can be controlled by the change of sputtering conditions (introduced gas pressure, discharge electric power). The sputtering methods are thus suitable for mass production. When the intermediate layer 14 or the magnetic recording layer 15 having the granular structure is formed, the grain boundary formation can be promoted by mixing a reactive gas such as oxygen or nitrogen with the introduced gas (reactive sputtering method). Further, applying a negative bias voltage to the substrate often promotes compositional segregation, whereby an excellent grain boundary structure can be obtained. This can improve the recording/reproducing characteristics of the medium. The negative bias voltage can be set, for example, between from −100V to −300V.

FIGS. 2(a) and 2(b) show schematic views of the configuration and components of a magnetic recording/reproducing apparatus according to an embodiment of the invention. FIG. 2(a) is a plan view, and FIG. 2(b) is a cross sectional view along line A-A' in FIG. 2(a). Applied to this magnetic recording/reproducing apparatus is the perpendicular magnetic recording medium 21 according to the embodiment of invention described above.

The perpendicular magnetic recording medium 21 is fixed to a spindle motor (medium driving section) 22 that rotationally drives the medium, and it is rotationally driven at a predetermined rate of rotation. A magnetic head 23 that accesses the perpendicular magnetic recording medium 21 to perform recording/reproducing operations is attached to the end of a suspension 24 comprising a metal leaf spring, and the suspension 24 is attached to an actuator 25 (head driving section) for controlling the position of the magnetic head. A controller 26 comprising an electronic circuit performs operation control for the recording medium and the head and processing of recording/reproducing signals.

Figure 2:
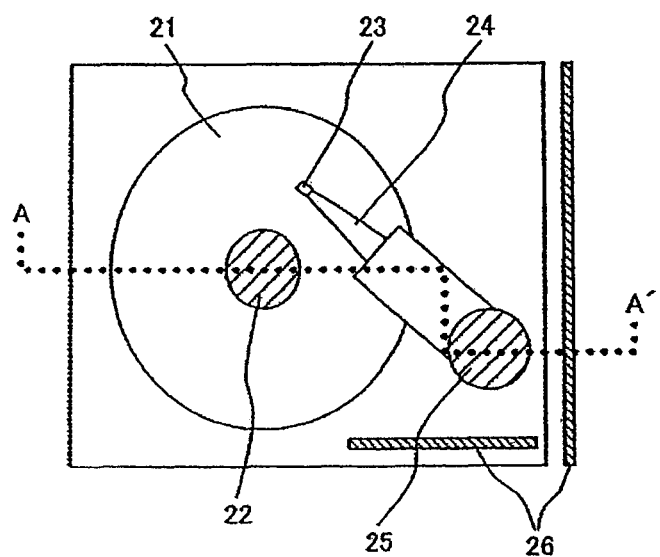
FIGS. 2(a) and 2(b) are views showing the structure and components of a magnetic recording/reproducing apparatus (hard disk drive) according to an embodiment of the invention.
Figure 2:
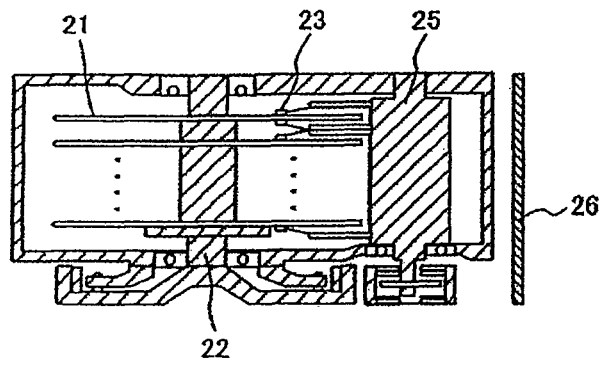
Figure 3:
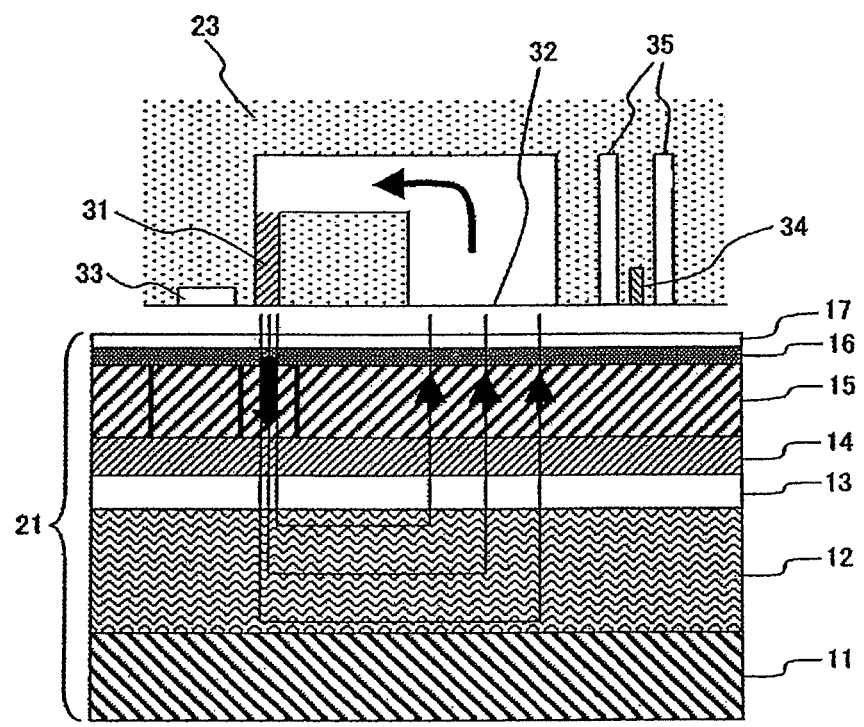
FIG. 3 is a cross sectional view of a region where the perpendicular magnetic recording medium and the magnetic head of a magnetic recording/reproducing apparatus according to an embodiment of the invention are close to each other.

FIG. 3 is a schematic cross-sectional view of a region where the perpendicular magnetic recording medium 21 and the magnetic head 23 are close to each other for an example of the magnetic recording/reproducing apparatus shown in FIGS. 2(a) and 2(b). The magnetic head 23 comprises: a recording device having a main write pole (main pole) 31, an auxiliary return pole (auxiliary pole) 32, and a trailing shield (magnetic shield) 33 disposed adjacently to the main pole 31; and a reproducing device in which a giant magnetoresistive (GMR) or tunnel magnetoresistive (TMR) sensor 34 is disposed between reproducing shields 35. The perpendicular recording head having the magnetic shield 33 at the periphery of the main pole 31 as described above is referred to as a shielded-pole type head. Since it has a greater writing magnetic field gradient than a single-pole type head not having the magnetic shield 33, it can form a steep magnetization transition and is suitable for high-density recording. However, it has a feature that the peak strength of the write magnetic field is decreased. The magnetic flux outgoing from the main pole 11 passes the soft-magnetic underlayer 12, reaching the auxiliary pole 32; then, information is recorded right below the main pole 31.

Referring to FIG. 1 and FIG. 4 to FIG. 11, perpendicular magnetic recording media according to examples are described below.

EXAMPLE 1

A multilayer thin film was formed on a cleaned reinforced-glass substrate 11 for a magnetic disk by a DC sputtering method using an in-line type sputtering apparatus. For the multilayer film, a 30-nm-thick AlTi amorphous alloy layer was first formed by using an $AlTi_{50}$ target (the subscript value shows the atomic percentage, at %, of the element content in the alloy, similarly below) for ensuring adhesion of the thin film to the glass substrate 11. Successively, a three-layered soft-magnetic underlayer 12 was formed by forming a soft magnetic amorphous layer to 30-nm thickness by using an $FeCo_{34}Ta_{10}Zr_5$ target, an antiferromagnetic coupling layer to 0.5-nm thickness by using an Ru target, and another soft magnetic amorphous layer to 30-nm thickness by using the $FeCo_{34}Ta_{10}Zr_5$ target. Further, a seed layer 13 of a two-layered structure was formed by forming in the following order an NiW alloy layer to 7-nm thickness by using an $NiW_8$ target and an Ru layer to 7-nm thickness by using a pure Ru target. The NiW alloy seed layer had the fcc structure where the (111) crystal direction was oriented in the direction perpendicular to the film surface. Further, the Ru intermediate layer had the hcp structure in which the c-axis was oriented in the direction perpendicular to the film surface. When all of the above layers were formed, a pure Ar gas was used as a process gas, and the gas pressure was set at 1 Pa.

After the seed layer 13, an intermediate layer 14 was formed by using a CoCr40 alloy target. The film formation was conducted by using a gas mixture of argon and oxygen at a total pressure of 4.0 Pa as a process gas and setting the film formation rate at 1 nm/s while applying a bias voltage at −200V to the disk to form a 4-nm-thick film. At this stage, various intermediate layers were formed by changing the condition of the oxygen partial pressure from 0 Pa to 0.2 Pa. When the composition of the intermediate layers prepared by adding oxygen to the process gas was analyzed by X-ray photoelectron spectroscopy, O (oxygen) was detected in addition to Co and Cr. The oxygen content was higher with increased partial pressure of the introduced oxygen gas.

After the intermediate layer 14, the magnetic recording layer 15 was formed. The magnetic recording layer 15 is constituted of a first magnetic layer and a second magnetic layer. First, the first magnetic layer was formed by using a $CoCr_{17}Pt_{18}$—$SiO_2$ (8 mol %) composite target. The first magnetic layer was formed to a thickness of 13 nm by using a gas mixture of argon and oxygen at a total pressure of 4 Pa at the oxygen gas ratio of 4% as a process gas and setting the film formation rate at 3 nm/s while applying a bias voltage at −275V to the disk. Further, the second magnetic layer was formed to a thickness of 5.5 nm in an Ar gas at 0.6 Pa using a $CoCr_{14}Pt_{14}B_8$ target.

The protecting layer 16 was formed on the magnetic recording layer 15 by discharging a carbon target in a gas mixture of argon and nitrogen at a total pressure of 1.5 Pa at a nitrogen gas ratio of 10%. The thickness of the protecting layer 16 was about 3.5 nm.

As a comparative example to the sample of this example having the $CoCr_{40}$ alloy intermediate layer, samples in which the intermediate layer was formed by using a pure Ru target (Comparative Example 1-1) and an $RuCr_{10}$ alloy target (Comparative Example 1-2) instead of the $CrCo_{40}$ alloy target were prepared. Forming conditions other than those for the intermediate layer were exactly the same. Film forming conditions for the intermediate layer were also made identical: a bias voltage at −200V was applied to a disk while using a gas mixture of argon and oxygen at a total pressure of 4.0 Pa as a process gas. The film formation rate was controlled to 1 nm/s, and the thickness was adjusted to 4 nm for the intermediate layer.

The samples of the examples and the comparative examples were measured using a pole Kerr magnetometer for magnetic hysteresis loops (Kerr loops) by applying a magnetic field in the direction perpendicular to the film surface of the sample perpendicular magnetic recording media. Based on the measured Kerr loops, the coercivity Hc of the magnetic recording layers of the perpendicular magnetic recording media was determined.

Figure 4:
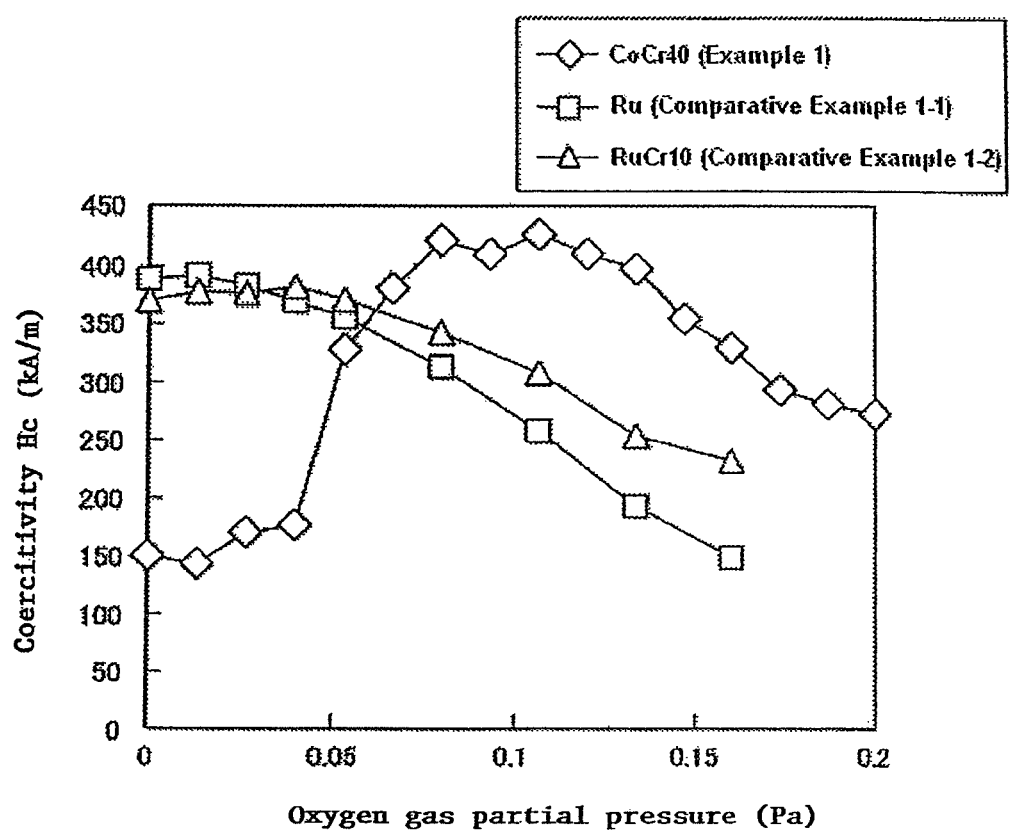
FIG. 4 is a graph showing a relation between a partial pressure of an oxygen gas upon formation of an intermediate layer and the coercivity Hc of a magnetic recording layer in perpendicular magnetic recording media of Example 1, Comparative Example 1-1, and Comparative Example 1-2.

FIG. 4 is a graph showing a relation between the partial pressure of the oxygen gas introduced upon formation of the intermediate layer and the coercivity Hc of the magnetic recording layer. As shown in FIG. 4, in the medium of the example using the $CoCr_{40}$ alloy for the intermediate layer, a high coercivity suitable for a recording medium could not be obtained when the partial pressure of the oxygen gas was low. One of the reasons would be that a crystal grain boundary comprising an oxide was less formed on the intermediate layer consisting only of the $CoCr_{40}$ alloy, and exchange interactions between the magnetic grains acting on the initial region in the magnetic recording layer could not be weakened sufficiently. However, when the partial pressure of the oxygen gas upon forming the $CoCr_{40}$ alloy layer was increased to 0.055 Pa or higher, the coercivity increased drastically and showed a value of about 420 kA/m at the maximum when the partial pressure of the oxygen gas is around 0.1 Pa. When oxygen was mixed with the process gas upon forming the $CoCr_{40}$ alloy layer, the oxygen gas bonds to Co and Cr (mainly Cr) to form oxides. It appears that the oxides became crystal grain boundaries, forming a fine granular structure in the intermediate layer, and that based on that structure, a granular structure having good crystal grain boundaries was formed in the magnetic recording layer from the initial region. In this case, since the $CoCr_{40}$ alloy used for the intermediate layer has a high Cr content to such an extent that it does not have magnetization, the intermediate layer does not affect magnetism, and the exchange interactions in the initial region in the magnetic recording layer is suppressed preferably. However, when the partial pressure of the oxygen gas was excessively high, the crystal orientation of the intermediate layer and the magnetic recording layer was deteriorated to lower the coercivity.

In contrast, in the medium using Ru or an alloy comprising mainly Ru in its intermediate layer as in Comparative Example 1-1 and Comparative Example 1-2, the highest coercivity was generated when the oxygen gas was not introduced at all or when the partial pressure of the oxygen gas was suppressed to a small amount. As is well-known, Ru is a metal with a high melting point and even without particular additives takes the form of a polycrystalline structure with clear crystal grain boundaries when formed by a sputtering method. However, when the oxygen gas is introduced to the Ru intermediate layer having such a property, scaling-down of the Ru crystal grains proceeds excessively, degrading the crystal orientation of the intermediate layer. It appears that the parameter behavior of Comparative Example 1-1 and Comparative Example 1-2 in FIG. 4 reflects the physical property of Ru described above.

The recording/reproducing characteristics (SNR) of the media of this example, Comparative Example 1-1 and Comparative Example 1-2 were evaluated by using spin stand RH 4160E manufactured by Hitachi High-Technologies Corp.

For the media to be subjected to the recording/reproducing measurement, a PFPE type lubricant was applied by using a dipping method after forming the multilayer thin film by sputtering, and the surface was varnished to remove protrusions or foreign substances. Also, it was confirmed in advance that there was no problem with the head flying by using a glide head. The magnetic head used was a head having a perpendicular recording device with a main pole width of 140 nm and a giant magnetoresistive (GMR) reproducing device with an inter-electrode distance of 100 nm and a shield gap length of 45 nm. The recording device was a shielded type head having a shield at the trailing end of the main pole. The rotational speed of the disk with respect to the magnetic head was controlled so that the linear speed was 10 m/s. The flying height of the magnetic head was about 8 nm in this case. Signal intensity S and cumulative medium noise N were measured when recording is performed at a linear recording density of 20.9 kfr/mm (530 kfci), and the signal-to-noise ratio (SNR) was determined.

Figure 5:
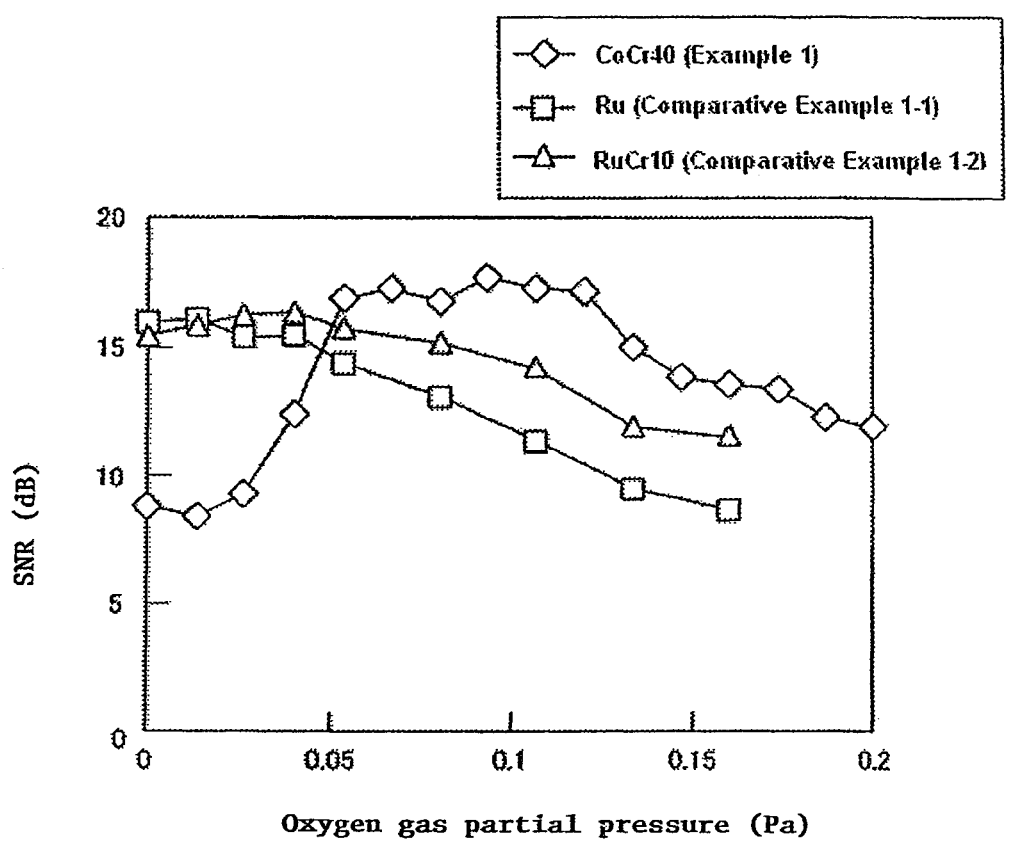
FIG. 5 is a graph showing a relation between the partial pressure of an oxygen gas upon forming an intermediate layer and a signal-to-noise ratio SNR during recording/reproduction in the perpendicular magnetic recording media of Example 1, Comparative Example 1-1, and Comparative Example 1-2.

FIG. 5 is a graph showing a relation between the partial pressure of the oxygen gas introduced upon film formation of each of the intermediate layers and SNR. The sample of this example having the intermediate layer formed by using the $CoCr_{40}$ alloy target exhibited a higher SNR than the Ru or $RuCr_{10}$ intermediate layer of the comparative examples between a sample A in which the oxygen gas partial pressure was set at about 0.055 Pa and a sample B in which the partial pressure of the oxygen gas was set at about 0.120 Pa. The partial pressure of the oxygen gas showing a high SNR in FIG. 5 generally agreed with that having achieved high coercivity in FIG. 4, and it can be seen that suppression of the exchange interactions in the initial region of the magnetic recording layer led to the improvement of the recording/reproducing performance. In a region where the partial pressure of the oxygen gas is excessively high, degradation of the recording/reproducing performance was more remarkable than the lowering of the coercivity. The reason would be that the recording/reproducing performance is more sensitive to the crystal orientation of the magnetic recording layer. When the content of the oxygen element in the sample A and the sample B was analyzed by X-ray photoelectron spectroscopy, it was about 6 at % for the sample A and about 20 at % for the sample B.

In the cases of Comparative Example 1-1 and Comparative Example 1-2, the recording/reproducing performance generally lowered with increased partial pressure of the oxygen gas. It appears that this also has a close correlation with the behavior of the coercivity in FIG. 4 and this corresponds to the degradation of the crystal orientation of the magnetic recording layer.

As described above, by adding oxygen to the CoCr-based alloy to form the intermediate layer and setting the content of the oxygen element in the intermediate layer in the range from 6 at % to 20 at %, the granular structure in the magnetic recording layer could be improved to decrease the exchange interactions between the magnetic grains. Correspondingly, the recording/reproducing performance of the recording medium was improved, resulting in a more excellent SNR than that of the recording medium having the Ru intermediate layer or the RuCr alloy intermediate layer. Accordingly, higher recording density can be attained by using the intermediate layer shown in this example.

Next, changes of the magnetic characteristics (Hc) and the recording/reproducing characteristics (SNR) depending on the thickness of the intermediate layer of the perpendicular magnetic recording medium according to Example 1 are to be discussed. A perpendicular magnetic recording medium was formed by using a formation method according to Example 1. Various samples varying in intermediate layer thickness from 0 nm to 10 nm were produced by using a CoCr40 alloy target and at the same time fixing the partial pressure of an oxygen gas of the process gas upon forming the intermediate layer at 0.1 Pa while changing the film formation time for the intermediate layer. Using these samples, changes of the magnetic characteristics and recording/reproducing characteristics depending on the thickness of the intermediate layer were investigated.

Figure 6:
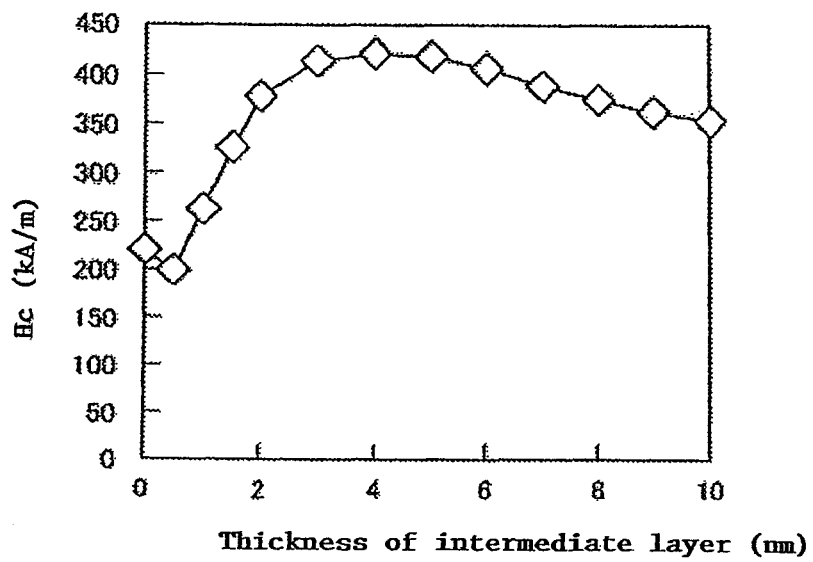
FIG. 6 is a graph showing a relation between the thickness of an intermediate layer and the coercivity Hc of a magnetic recording layer in the perpendicular magnetic recording media of Example 1.

FIG. 6 is a graph showing a relationship between the thickness of the intermediate layer 14 and the coercivity Hc of the magnetic recording layer 15. When the intermediate layer was excessively thin, the coercivity of the magnetic recording layer did not increase sufficiently. The reason would be that formation of the granular structure does not proceed sufficiently in the intermediate layer when the thickness of the intermediate layer is small, and correspondingly, the crystal grain boundary in the magnetic recording layer is deteriorated. As the thickness of the intermediate layer increased, the coercivity increased drastically, taking the maximum value when the layer thickness is around 4 nm and decreasing gradually at higher thickness values. The main reason that the coercivity decreased at larger thicknesses would be that the average crystal grain size in the magnetic recording layer decreases, for example, because the micro crystal grains formed in the intermediate layer break up in the upper portion of the intermediate layer.

When the crystal orientation of the magnetic recording layer 15 were investigated, the value of $\Delta\theta 50$ was in the range from 3.4 to 3.7°, showing no significant change depending on the thickness of the intermediate layer. It appears that the crystal orientation of the magnetic recording layer 15 are maintained by the seed layer 13 in the case of this embodiment.

Figure 7:
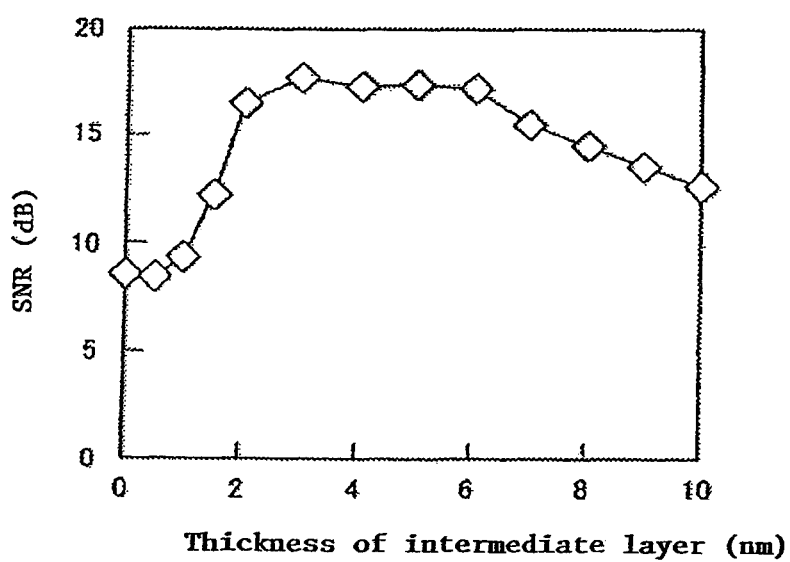
FIG. 7 is a graph showing a relation between the thickness of an intermediate layer and a signal-to-noise ratio SNR during recording/reproduction in the perpendicular magnetic recoding media of Example 1.

The recording/reproducing characteristics (SNR) of the perpendicular magnetic recording medium of the above samples were evaluated by the spin stand. FIG. 7 is a graph showing a relation between the thickness of the intermediate layer 14 and SNR of the magnetic recording layer 15. It can be seen from FIG. 7 that particularly preferred recording/reproducing characteristics were obtained when the thickness of the intermediate layer was in the range from 2 nm to 6 nm. When the thickness of the intermediate layer was less than 2 nm, however, preferred recording/reproducing characteristics could not be obtained probably because the exchange interactions were not decreased sufficiently between the magnetic grains in the initial region of the magnetic recording layer. There are mainly two reasons for the decrease of the recording/reproducing performance in a range where the thickness of the intermediate layer was more than 6 nm. First, the distribution of the crystal grain size may have widened in the course of decrease in the crystal grain size of the magnetic recording layer 15. Secondly, the distribution of the recording magnetic field may have become less sharp by increase of the distance between the magnetic recording layer 15 and the soft-magnetic underlayer 12.

As can be understood from the foregoing it is preferred to set the thickness of the intermediate layer in the range from 2 nm to 6 nm when the perpendicular magnetic recording medium of Example 1 is to be produced. This allows for high coercivity Hc and high recording/reproducing performance (SNR).

Next, changes of the magnetic characteristics (Hc) and recording/reproducing characteristics (SNR) depending on the alloy composition of the intermediate layer of the perpendicular magnetic recording medium according to Example 1 are to be discussed. A perpendicular magnetic recording medium was formed by using the formation method according to Example 1, and the magnetic characteristics and recording/reproducing characteristics were measured. The partial pressure of the oxygen gas as the process gas during formation of the intermediate layer was set at 0.1 Pa, and the thicknesses of the intermediate layers were uniformly 4 nm. On the other hand, samples were produced by changing the Co content in the CoCr alloy target for the intermediate layer from 30 at % to 90 at %, and changes of the magnetic characteristics (Hc) and recording/reproducing characteristics (SNR) depending on the alloy composition of the intermediate layer were investigated.

Figure 8:
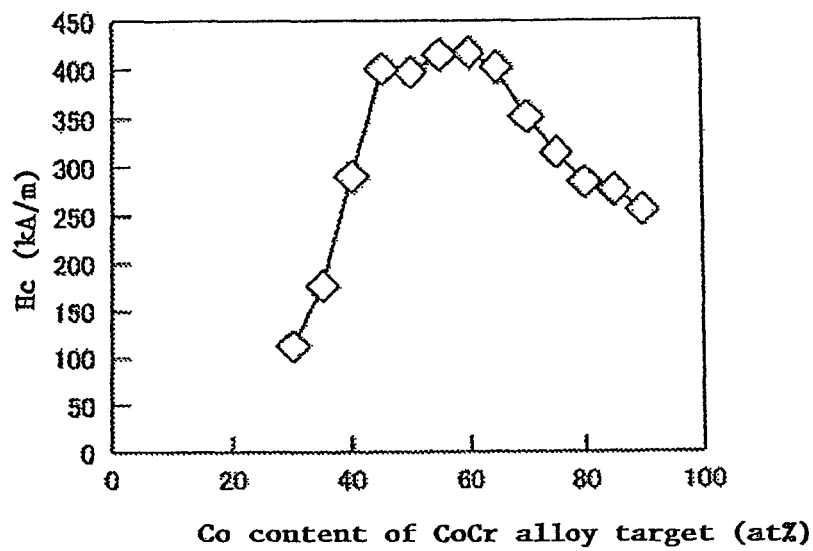
FIG. 8 is a graph showing a relation between the content of a Co element in an intermediate layer and the coercivity Hc of a magnetic recording layer in the perpendicular magnetic recording media of Example 1.
Figure 9:
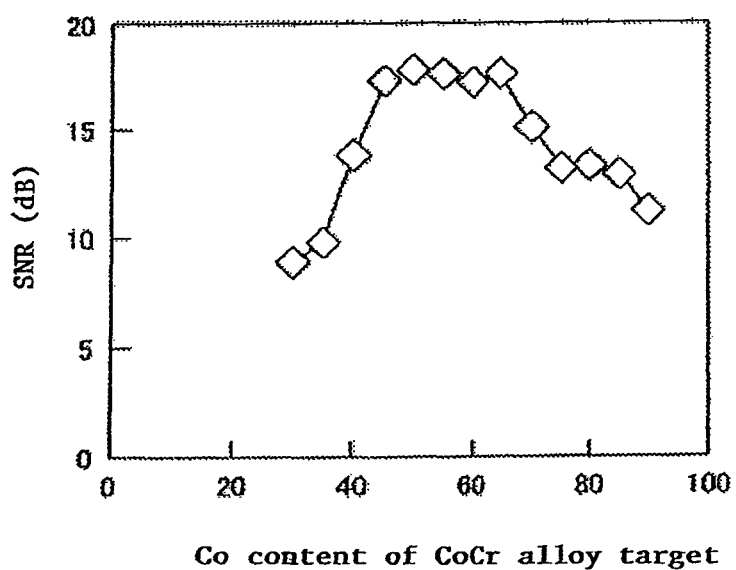
FIG. 9 is a graph showing a relation between the content of a Co element in an intermediate layer and a signal-to-noise ratio SNR during recording/reproduction in the perpendicular magnetic recording media of Example 1.

FIG. 8 is a graph showing a relation between the Co content of the CoCr alloy target used for forming the intermediate layer 14 and the coercivity Hc of the magnetic recording layer 15. FIG. 9 is a graph showing a relationship between the Co content of the CoCr alloy target and SNR. As a result of composition analysis, the ratio of Co to Cr in the intermediate layer 14 substantially agreed with that in the CoCr alloy target. FIG. 8 and FIG. 9 reveal that the compositional range capable of producing a high coercivity Hc and a high SNR is the range from 45 at % to 65 at %. Within this range, the values of the coercivity Hc and the SNR scarcely changed, and preferred characteristics were obtained uniformly.

When the crystal structure of the magnetic recording layer 15 was investigated, it had an hcp structure and the $\Delta\theta 50$ value of its c-axis was maintained at about 3.5° when the Co content was 45 at % or more. However, as the Co content decreased to less than 45 at %, the $\Delta\theta 50$ value started to increase, and when the content was further lowered, the hcp structure itself was no more observed. It appears from the foregoing that the reason the coercivity Hc and the SNR decreased when the Co content was less than 45 at % is that the Co element contained in the intermediate layer was scarce to make the hcp structure instable, thus deteriorating the crystal orientation of the magnetic recording layer.

Further, when the CoCr alloy layer was formed by using an alloy target with the Co content of more than 65 at %, it was found from an experiment conducted separately that saturation magnetization higher than 20 kA/m was generated in the CoCr alloy layer. It appears from the above that when the Co content was more than 65 at %, the magnetization generated in the intermediate layer magnetically coupled with the magnetic recording layer, thereby decreasing the coercivity Hc and degrading the recording/recording characteristics (SNR).

As can be seen from the foregoing, when the perpendicular magnetic recording medium of Example 1 is to be formed, it is essentially important that the intermediate layer substantially comprises a non-magnetic metal and has an hcp structure where the crystal c-axis is oriented in the direction perpendicular to the film surface. For this purpose, it is preferred to define the content of the Co element in the metal elements of the intermediate layer within the appropriate range described above. This can provide high coercivity Hc and high recording/reproducing performance (SNR).

EXAMPLE 2

The perpendicular magnetic recording medium of Example 2 is characterized in that an intermediate layer is formed by using a target in which a CoCr alloy is mixed with various oxide materials. In Example 2, perpendicular magnetic recording media were formed by using the same materials, structure, and the formation method as those of Example 1 except for the intermediate layer and the seed layer. The magnetic characteristics and recording/reproducing characteristics of the produced samples were measured by the evaluation method shown in Example 1.

According to the procedures shown in Example 1, the medium was formed first as far as the soft-magnetic underlayer 12. A Ti layer of 8 nm thickness was then formed thereon using a pure Ti target. Then, a Cu layer of 1 nm thickness was formed by using a pure Cu target, and successively, an NiW alloy layer of 7 nm thickness was formed by using an $NiW_8$ target. Thus, the seed layer 13 of a 3-layered stack structure comprising the Ti layer, the Cu layer, and the NiW alloy layer was formed. A pure Ar gas was used for the process gas. The Ar gas pressure was set at 1 Pa upon forming the Ti layer and the Cu layer and at 2.8 Pa upon forming the NiW alloy layer. An Ru layer was not used at all for the seed layer 13 of this example. The Ru layer having the hcp structure is highly effective in improving the crystal orientation in each of the layers formed above the seed layer. In this example, degradation of the crystal orientation was prevented by applying the Ti layer having the same hcp structure to the first layer of the seed layer instead of the Ru layer. The thin Cu layer grows in insular shape on the Ti layer and is believed to have the role of providing an environment where the NiW alloy layer on the Cu layer tends to grow in granular form.

After the NiW alloy layer, the intermediate layer 14 was formed by using a target formed by mixing a $CoCr_{40}$ alloy and various oxides. The film formation rate was set at 1 nm/s, and the thickness was set at 4 nm. The film formation was conducted by using a gas mixture of argon and oxygen at a total pressure of 4.0 Pa as a process gas while applying a bias voltage at −200V to the disk. The partial pressure of the oxygen gas was set on a target-by-target basis such that the coercivity was highest.

On the intermediate layer 14, the magnetic recording layer 15 and the succeeding layers were formed by the procedures shown in Example 1 again. FIG. 10 is a table showing the $CoCr_{40}$ alloy and the oxides in the target composition used for forming the intermediate layer 14, the partial pressure of the oxygen gas applied upon formation of the intermediate layer, the coercivity Hc of the magnetic recording layer obtained by magnetic characteristics evaluation, and the SNR obtained by recording/reproducing characteristics evaluation.

In FIG. 10, Sample 2-1 is the case where an oxide is not contained in the target as shown in Example 1. In this case, preferred characteristics could be obtained by setting the partial pressure of the oxygen gas at a somewhat high value, 0.1 Pa. In the other samples and comparative examples, mixed targets of metals and oxides were used. In these cases, excellent characteristics were obtained at a relatively low oxygen gas partial pressure (0.03 Pa or lower) due to the effect of the oxygen element contained in the target. Among all, when oxides of Si, Ti and Ta were used as in Sample 2-2 to Sample 2-6, high recording/reproducing characteristics (SNR) could be obtained easily. This is probably because the oxides of Si, Ti, and Ta are chemically stable compared with a Cr oxide and easily form crystal grain boundaries in the intermediate layer. While acceptable SNRs were obtained also by using a target containing oxides of Zr or Al as in Sample 2-7 and Sample 2-8, they were somewhat inferior to the SNRs in sample 2-2, etc.

On the other hand, when the total content of the oxides exceeds 10 mol % as in Comparative Example 2-1 and Comparative Example 2-2, the recording/reproducing performance (SNR) lowered drastically. This is probably due to the excessively high content of the oxygen element in the formed intermediate layer, as in Example 1 where the excessive partial pressure of the oxygen gas lowered the recording/reproducing performance.

EXAMPLE 3

In the perpendicular magnetic recording medium of Example 3, a metal element having the fcc crystal structure by itself was added to the intermediate layer 14. Perpendicular magnetic recording media were formed by the same method as in Example 2 except for the material composition of the targets used upon formation of the intermediate layer 14. Further, the magnetic characteristics (Hc) and recording/reproducing characteristics (SNR) were measured by using the same evaluation method as in Example 1. FIG. 11 is a table showing metal alloys and oxides in the material composition of the intermediate layer targets, the partial pressure of the oxygen gas applied upon formation of the intermediate layer, the coercivity Hc of the magnetic recording layer obtained by magnetic characteristics evaluation, and the SNR obtained by recording/reproducing characteristics evaluation.

Sample 3-1 to Sample 3-6 shown in FIG. 11 each contain one of the fcc metal elements from among Cu, Ni, Pd, and Pt in the alloy of the intermediate layer target and each contain $SiO_2$ as an oxide material. Those media showed higher coercivity Hc and SNR than those of a similar medium (sample 2-2) not containing the fcc metal element in its intermediate layer. Sample 3-7 also showed higher coercivity Hc and SNR than those of a similar medium (Sample 2-1) not containing the fcc metal element in its intermediate layer. However, when the additive amount of Ni or Pd was excessive as in Sample 3-8 or Sample 3-9, the coercivity Hc of the magnetic recording layer 15 decreased, and no SNR improvements were observed.

Further, it can be seen from FIG. 11 that media with an addition of Pd or Pt (Samples 3-3, 3-4, 3-6) each have a higher SNR by about 0.7 to 0.8 dB on average than those of media with an addition of Cu or Ni to the intermediate layer 14 (Samples 3-1, 3-2, 3-5). The reason would be that addition of Pd or Pt to the intermediate layer improves the crystal lattice matching between the intermediate layer and the magnetic recording layer, thus improving the crystal orientation of the magnetic recording layer. In fact, when Δθ50 of the magnetic recording layers were measured and the media were compared with each other, media with an addition of Pd or Pt to the intermediate layer each showed a smaller value than the others by about 0.2°.

As described above, it is possible to further improve the magnetic characteristics and the recording/reproducing characteristics of perpendicular magnetic recording media by adding an appropriate amount of the fcc metal element such as Cu, Ni, Pd and Pt into the microcrystal grains in the intermediate layer.

As has been described above, according to the perpendicular magnetic recording media of Examples 1 to 3, a continuous crystal grain boundary structure can be formed at the interface between the magnetic recording layer and the intermediate layer to eliminate the imperfect structure of the crystal grain boundary formed in the existent initial growth layer of a conventional magnetic recording layer. Along with the structural improvement, it is possible to decrease the exchange coupling between magnetic grains and accurately control magnetization reversal in the magnetic recording layer in small reversal units, whereby a perpendicular magnetic recording medium suitable for high-density magnetic recording and having a higher write signal quality can be provided. At the same time, thermal fluctuation resistance of the information recorded on the medium can be improved by properly controlling the crystal grain size and the crystal orientation.

Further, by mounting any of the perpendicular magnetic recording media of Examples 1 to 3 described above on the magnetic recording/reproducing apparatus shown in FIG. 2, the magnetization reversal of the perpendicular magnetic recording medium can be accurately controlled in small reversal units; thus, a magnetic recording/reproducing apparatus having high write signal quality can be attained. Further, a good fine structure of the magnetic recording layer can be obtained by a relatively thin intermediate layer. This means that the distance between the soft-magnetic underlayer and the magnetic recording layer can be shortened in the perpendicular magnetic recording medium. In the magnetic recording/reproducing apparatus, for making the density of information to be recorded higher, it is necessary to increase recording magnetic field gradients by the method, for example, of miniaturizing the pole of the magnetic head. In this case, the maximum generated magnetic field of the magnetic head decreases. However, when the distance from the magnetic head to the soft-magnetic underlayer is shortened by the perpendicular magnetic recording medium of embodiments of the invention, the magnetic field generated by the magnetic head can be increased. Therefore, in the magnetic recording/reproducing apparatus of embodiments of the invention, good recording/reproducing characteristics can be maintained also in the case of using a magnetic head capable of generating only a relatively small write magnetic field, and further higher density can be attained.

What is claimed is:

1. A perpendicular magnetic recording medium comprising:
   a substrate;
   an intermediate layer;
   a seed layer of a face-centered cubic structure positioned on a substrate side of the intermediate layer, the seed layer comprising a first layer of an alloy including Ni as its main component and materials selected from Ta and W at 10 at % or less in total, a Cu layer positioned below the first layer, and a Ti layer positioned below the Cu layer;
   a magnetic recording layer; and
   a protecting layer, said substrate layer, said intermediate layer, and said magnetic recording layer formed above the substrate,
   wherein:
   the intermediate layer comprises a mixture of a first material and a second material, the first material is a non-magnetic alloy comprising Co and Cr as its main components, the second material is an oxide, and the average content ratio of an oxygen element in the intermediate layer is in the range from 10 at % to 20 at %, and
   a grain diameter of crystal grains of the intermediate layer and a grain diameter of crystal grains of the magnetic recording layer are both in a range from 5 nm to 15 nm.

2. The perpendicular magnetic recording medium according to claim 1, wherein the magnetic recording layer includes a magnetic alloy comprising a CoCrPt alloy as its main component and an oxide.

3. The perpendicular magnetic recording medium according to claim 1, wherein the intermediate layer and the magnetic recording layer are disposed adjacent to each other.

4. The perpendicular magnetic recording medium according to claim 1, wherein a content of the Co element in the non-magnetic alloy of the intermediate layer material is in the range from 45 at % to 65 at %.

5. The perpendicular magnetic recording medium according to claim 1, wherein the thickness of the intermediate layer is in the range from 2 nm to 6 nm.

6. The perpendicular magnetic recording medium according to claim 1, wherein the oxide of the intermediate layer material includes less than 10 mol % in total of materials selected from the group consisting of Si, Ti, and Ta.

7. The perpendicular magnetic recording medium according to claim 1, wherein the first material of the intermediate layer further includes materials selected from the group consisting of Pd, Ni, and Cu such that the atomic percentage of the selected materials in total is in the range from 2% to 8%.

8. The perpendicular magnetic recording medium according to claim 1, wherein a soft-magnetic underlayer (customary usage) is present between the substrate and the seed layer.

9. The perpendicular magnetic recording medium according to claim 1, wherein the magnetic recording layer has a first recording layer comprising a magnetic alloy including a CoCrPt alloy as its main component and an oxide, and a second recording layer comprising a CoCrPt alloy as its main component and an oxide, wherein an oxide content in the second recording layer is greater than zero and less than an oxide content in the first recording layer.

10. A magnetic recording/reproducing apparatus comprising:
    a magnetic recording medium;
    a medium driving section for driving the magnetic recording medium;
    a magnetic head for performing recording/reproducing operations on the magnetic recording medium; and
    a head driving section for positioning the magnetic head at a desired track position on the magnetic recording medium;
    wherein
    the magnetic recording medium has at least an intermediate layer, a seed layer, a magnetic recording layer, and a protecting layer formed above a substrate, in which
    the intermediate layer comprises a mixture of a first material and a second material, the first material is a non-magnetic alloy comprising Co and Cr as its main components, the second material is an oxide, and the average content ratio of an oxygen element in the intermediate layer is in the range from 10 at % to 20 at %,
    the seed layer has a face-centered cubic structure and is positioned on a substrate side of the intermediate layer, the seed layer comprising a Ti layer, a Cu layer positioned above the Ti layer, and an alloy including Ni as its main component and materials selected from Ta and W at 10 at % or less in total positioned above the Cu layer, and
    wherein a grain diameter of crystal grains of the intermediate layer and a grain diameter of crystal grains of the magnetic recording layer are both in a range from 5 nm to 15 nm.

11. The magnetic recording/reproducing apparatus according to claim 1 wherein the magnetic recording medium includes a soft-magnetic underlayer between the substrate and the intermediate layer.

12. A magnetic recording/reproducing apparatus according to claim 11, wherein the magnetic head includes a recording device and a reproducing device, and the recording device includes a main pole, an auxiliary pole, and a magnetic shield at the periphery of the main pole.

13. A perpendicular magnetic recording medium comprising:
    a substrate;
    an intermediate layer;
    a seed layer of a face-centered cubic structure on a substrate side of the intermediate layer, the seed layer comprising a Ti layer, a Cu layer positioned above the Ti layer, and an alloy including Ni as its main component and materials selected from Ta and W at 10 at % or less in total positioned above the Cu layer,
    a magnetic recording layer disposed adjacent to the intermediate layer; and
    a protecting layer, said seed layer, said intermediate layer, and said magnetic recording layer formed above the substrate,
    wherein the intermediate layer comprises a mixture of a first material and a second material,
    wherein the first material is a non-magnetic alloy comprising Co and Cr as its main components along with materials selected from a group consisting of Pd, Ni, and Cu such that an atomic percentage of the selected materials in total is in a range from 2% to 8%, wherein the second material is an oxide with an average content ratio of an oxygen element in the intermediate layer being in a range from 10 at % to 20 at %, wherein a content of the Co element in the non-magnetic alloy of the intermediate layer material is in a range from 45 at % to 65 at %, wherein the oxide of the intermediate layer material includes less than 10 mol % in total of materials selected from a group consisting of Si, Ti, and Ta, and wherein a grain diameter of crystal grains of the intermediate layer and a grain diameter of crystal grains of the magnetic recording layer are both in a range from 5 nm to 15 nm.

14. The perpendicular magnetic recording medium according to claim 1, wherein the first material further comprises Pd such that an atomic percentage of the Pd in total is in a range from 2% to 8%.

15. The perpendicular magnetic recording medium according to claim 1, wherein a full width at half maximum Δθ50 of a rocking curve of the intermediate layer and the magnetic recording layer is about 4° or less.

16. The magnetic recording/reproducing apparatus according to claim 10, wherein the magnetic recording medium includes a soft-magnetic underlayer between the substrate and the intermediate layer.

17. The magnetic recording/reproducing apparatus according to claim 10, wherein the magnetic head includes a recording device and a reproducing device, and the recording device includes a main pole, an auxiliary pole, and a magnetic shield at the periphery of the main pole.

18. The perpendicular magnetic recording medium according to claim 1, wherein the first material further comprises Pd such that an atomic percentage of the Pd in total is in a range from 2% to 8%, wherein a full width at half maximum Δθ50 of a rocking curve of the intermediate layer and the magnetic recording layer is about 4° or less, wherein a content of the Co element in the non-magnetic alloy of the intermediate layer material is in the range from 45 at % to 65 at %, wherein the thickness of the intermediate layer is in the range from 2 nm to 6 nm, and wherein the oxide of the intermediate layer material includes less than 10 mol % in total of materials selected from the group consisting of Si, Ti, and Ta.

19. The perpendicular magnetic recording medium according to claim 1, wherein the seed layer controls a crystal orientation of the intermediate layer.

20. The magnetic recording/reproducing apparatus according to claim 10, wherein the first material of the intermediate layer further includes materials selected from the group consisting of Pd, Ni, and Cu such that the atomic percentage of the selected materials in total is in the range from 2% to 8%.

* * * * *